United States Patent

[11] 3,595,286

| [72] | Inventor | Harold Phil Coffey |
| | | R.F.D. #4, Hickman, Ky. 42050 |
| [21] | Appl. No. | 835,922 |
| [22] | Filed | June 24, 1969 |
| [45] | Patented | July 27, 1971 |

[54] TREE CUTTING BLADE FOR DRAG LINES
14 Claims, 5 Drawing Figs.

[52] U.S. Cl............................................. 144/34 R, 37/2
[51] Int. Cl........................................ A01g 23/02
[50] Field of Search.......................... 144/34 R, 34 A, 34 B, 34 F, 2 Z; 37/2 R, 2 P

[56] References Cited
UNITED STATES PATENTS

| 1,023,173 | 4/1912 | Raber.......................... | 37/2 |
| 1,295,364 | 2/1919 | Peterson..................... | 37/2 |
| 2,703,044 | 3/1955 | Adair.......................... | 37/2 |
| 2,857,690 | 10/1958 | Yake et al.................. | 37/2 |
| 2,877,572 | 3/1959 | Dyess......................... | 37/2 |
| 2,950,546 | 8/1960 | Wigginton.................. | 37/2 |
| 3,022,836 | 2/1962 | Bechman.................... | 37/2 |

Primary Examiner—Gerald A. Dost
Attorneys—Clarence A. O'Brien and Harvey B. Jacobson ABSTRACT: An upright frame including front and rear ends and adapted at its forward end for securement to a drag line and at an upper portion of its rear end for attachment to a hoist cable. The frame includes a horizontal forwardly inclined cutter blade projecting outwardly from one side of a lower portion of the frame adjacent the rear end thereof as well as an upper horizontally outwardly projecting abutment arm spaced above the cutter blade for abutting a tree trunk portion disposed above the area of the tree trunk against which the cutter blade is advanced.

PATENTED JUL 27 1971 3,595,286
Fig. 1
Fig. 2
Fig. 3
Fig. 4
Fig. 5
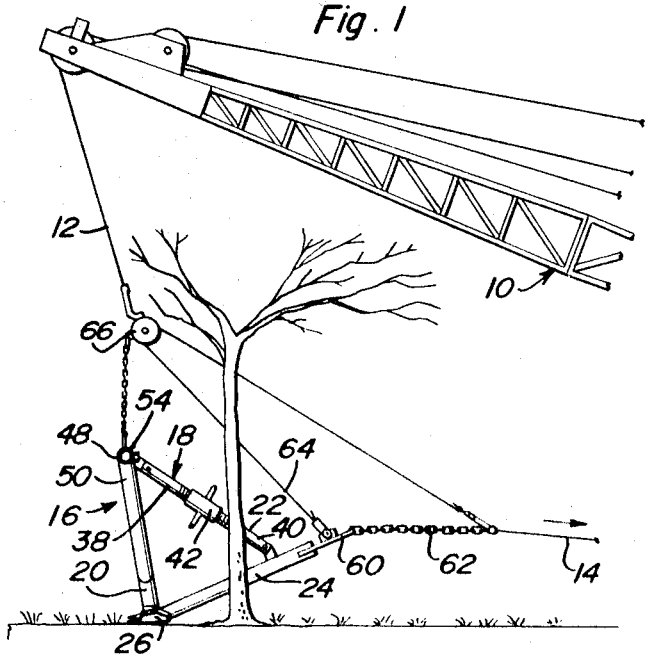
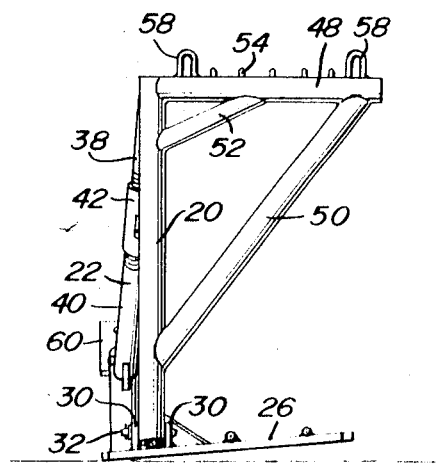
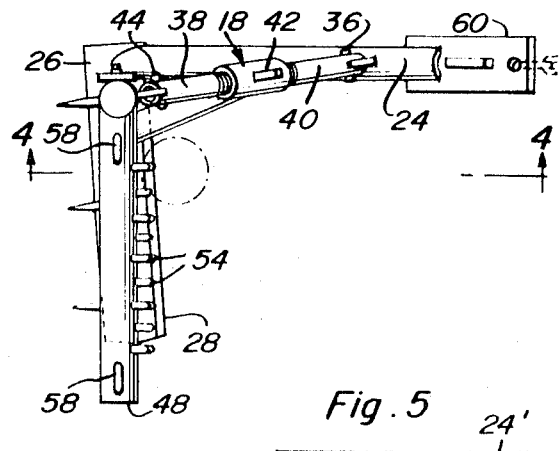
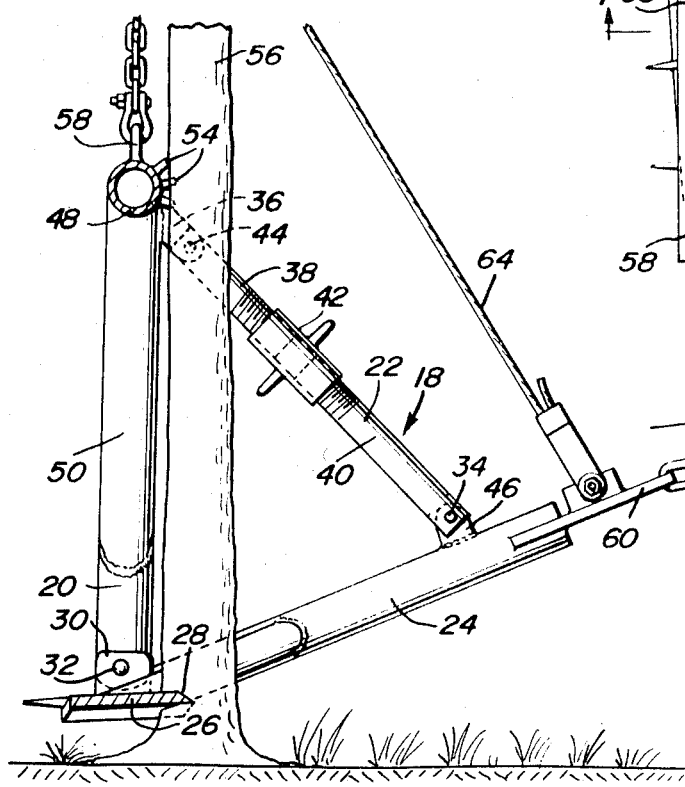
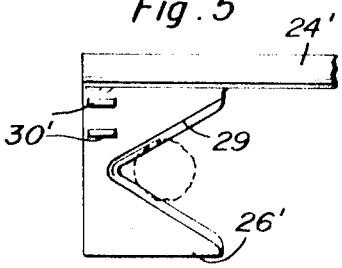
Harold Phil Coffey
INVENTOR
BY Clarence A. O'Brien
and Harvey B. Jacobson
Attorneys

TREE CUTTING BLADE FOR DRAG LINES

This invention relates to a tree-cutting blade adapted to be dragged along the ground by a drag line and to be utilized in clearing trees from soft ground which will not support tractors and bulldozers.

The tree-cutting blade is designed to be pulled by a drag line conventionally utilized to pull a drag line bucket and to be used to cut timber where brush, soft ground and other physical characteristics prevent operation of a bulldozer or a tractor.

The tree-cutting blade is formed primarily of tubular stock with the exception of its cutting blade portion and the various tubular components thereof are secured together by welding as well as by specifically positioned pivot pin structures. The cutting blade portion of the invention is angularly adjustable about a horizontal axis extending transverse to the direction of movement of the tree-cutting device and the upper portion of the tree-cutting device includes means whereby it may contact a tree trunk which is to be cut above the portion of the trunk against which the blade portion of the invention is advanced so as to maintain the tree-cutting device at least generally stationarily positioned relative to the tree trunk being cut.

The main object of this invention is to provide a land clearing apparatus which may be utilized on a crane boom in lieu of a drag line bucket and which will serve to clear land of bush and trees when conditions exist that prevent operation of tractors or bulldozers on the land to be cleared.

Another object of this invention is to provide a land clearing apparatus in accordance with the immediately preceding object and constructed in a manner whereby it may be merely connected to a drag line in lieu of a conventional drag line bucket.

A still further object of this invention is to provide a land-clearing apparatus provided with adjustment means whereby the cutting blade portion thereof may be adjustably inclined about a horizontal axis extending transversely of the direction of movement of the land-clearing apparatus.

A final object of this invention to be specifically enumerated herein is to provide a land-clearing apparatus which will conform to conventional forms of manufacture, be of simple construction, and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the land clearing apparatus of the instant invention supported from a drag line crane in lieu of the drag line bucket of the crane and with land-clearing apparatus in position being advanced toward a tree whose trunk portion is to be cut;

FIG. 2 is a rear elevational view of the land clearing apparatus;

FIG. 3 is an enlarged top plan view of the assemblage illustrated in FIG. 2;

FIG. 4 is a further enlarged longitudinal vertical sectional view taken substantially upon the plane indicated by section line 4—4 of FIG. 3 and illustrating the manner in which the blade portion of the land clearing apparatus is advanced toward and cuts through a representative tree trunk; and FIG. 5 is a fragmentary top plan view of the lower forwardly and upwardly inclined member of a modified form of land clearing apparatus which utilizes a V-shaped cutting blade in lieu of straight cutting blade such as that illustrated in FIGS. 1—4.

Referring now more specifically to the drawings the numeral 10 generally designates a conventional form of crane boom and the numeral 12 refers to a hoist cable supported from the crane boom. Also, a drag line cable 14 is provided and the land clearing apparatus of the instant invention is referred to in general by the reference number 16. The land-clearing apparatus or device 16 includes a frame referred to in general by the reference numeral 18. The frame 18 includes a rear elongated upstanding member 20 and a pair of forwardly projecting and convergent elongated members 22 and 24.

The rear end of the lower rearwardly and downwardly inclined member 24 includes a horizontally outwardly projecting elongated blade member 26 whose forward edge is sharpened as at 28. The blade member 26 includes a pair of upwardly projecting mounting ears 30 having registered apertures formed therein and the lower end of the member 20 is secured between the ears or mounting lugs 30 by means of a pivot pin 32. In addition, the forward end of the lower member 24 includes an apertured mounting ear 34 and the upper end of the member 20 includes a forwardly projecting apertured mounting ear 36.

The member 22 comprises a turnbuckle including upper and lower sections 38 and 40 interconnected by means of a center internally threaded sleeve section 42 and the upper end of the upper section 38 is bifurcated and pivotally secured to the mounting ear or lug 36 by means of a pivot fastener 44. Likewise, the lower end of the lower section 40 is bifurcated and pivotally secured to the mounting ear or lug 34 by means of a pivot pin 46. Accordingly, the included angle defined between the members 20 and 24 may be varied by rotating the center internally threaded sleeve section 42, as desired.

The upper end of the upstanding member 20 includes a horizontally outwardly projecting tubular abutment arm 48 which is secured at its inner end to the upper end of the upstanding member 20 and braced at its outer end by means of an inclined tubular brace 50 extending downwardly from the outer end of the arm 48 and the lower end portion of the adjacent side of the upright member 20. In addition, a second inclined brace 52 is also connected between the abutment arm 48 and the upstanding member 20.

The forwardly facing surface portions of the abutment arm 48 include longitudinally and circumferentially spaced spikes 54 which are operative to dig into and thus frictionally grip a tree trunk such as trunk 56 illustrated in FIG. 6, and the opposite ends of the abutment arm 48 include upwardly projecting lifting hook portions 58 for attaching the land-clearing apparatus 16 to the hoist cable 12.

The forward end of the lower member 24 includes an anchor plate 60 to which the rear end of a chain section 62 extending rearwardly from the drag cable 14 is secured. In addition, a cable bridle 64 has one end secured to the plate 60, the other end secured to the rear end of the drag cable 14 and its midportion passed about a pulley wheel 66 journaled from the lower end of the hoist cable 12.

In operation, the crane boom 10 and hoist cable 12 may be utilized to maintain the frame 18 upright while the latter is being advanced forwardly over the ground by the drag cable 14 toward the tree trunk 56. As the sharpened edge 28 of the blade member 26 engages the lower portion of the tree trunk 56, the forward end of the frame 18 swings slightly downwardly so as to move the abutment arm 48 and its spikes 54 into engagement with a portion of the tree trunk 56 disposed above the cutting blade 58 whereby the frame 18 is maintained in an upright position by frictional engagement with the tree trunk 56.

In FIG. 5 of the drawings there may be seen a modified form of lower member 24' which corresponds to the lower member 24 but which differs therefrom in that the blade member 26' supported therefrom has a forwardly opening notch 29 formed therein. Accordingly, the blade member 26' will cradle the lower portion of the tree trunk 56 therein to further insure that the land-clearing apparatus 16 will not slip once it is engage with the tree trunk 56. Of course, the blade member 26' includes apertured mounting ears 30' which correspond to the apertured mounting ears 30. Therefore, it may be readily appreciated that the lower member 24' may be fully substituted for the lower member 24 and its blade member 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An upright narrow frame including front and rear ends and disposed in an upstanding front to rear extending plane, said front end being adapted for securement to a dragline, said frame further including horizontal forwardly facing cutter blade means projecting outwardly from one side of a lower portion of the frame adjacent the rear end thereof as well as an upper horizontally outwardly projecting abutment arm spaced above the cutter blade means for abutting a portion of an upright tree trunk spaced above a lower portion of the trunk against which the cutter blade means is advanced, said frame, at an upper rear portion thereof, including means for anchoring a hoist line thereto, said one side of said frame being free of outwardly projecting portion thereof disposed forward of said blade means and arm, and said other side of said frame being free of outwardly projecting portions throughout its length and height.

2. The combination of claim 1 wherein the forwardly facing portions of said abutment arm include spaced forwardly projecting spikes for biting into said tree trunk above said blade means.

3. The combination of claim 1 wherein said frame includes means operative to angularly adjust said cutter blade means about a horizontal transverse axis relative to a transverse vertical plane containing said abutment arm and blade means.

4. The combination of claim 1 wherein said forwardly facing blade means defines a forwardly opening notch in which to receive a tree trunk portion to be cut by said blade means.

5. The combination of claim 1 wherein said frame includes an upstanding rear member and a pair of elongated forwardly convergent upper and lower members projecting forwardly from the upper and lower ends of the rear member and joined at their forward ends.

6. The combination of claim 5 wherein said members are each pivotally connected to the adjacent members for relative angular displacement about a horizontal transverse axis.

7. The combination of claim 6 wherein said upper member includes means for adjusting its effective length, said cutter blade means being carried by said lower member.

8. The combination of claim 1 including an inclined brace extending and secured between the outer end of said arm and the rear lower portion of said frame.

9. The combination of claim 8 wherein said frame includes an upstanding rear member and a pair of elongated forwardly convergent upper and lower members projecting forwardly from the upper and lower ends of the rear member and joined at their forward ends, said inclined brace extends between the outer end of said arm and the lower end of said rear member.

10. The combination of claim 9 wherein said members are each pivotally connected to the adjacent members for relative angular displacement about a horizontal transverse axis.

11. The combination of claim 10 wherein said upper member includes means for adjusting its effective length, said cutter blade means being carried by said lower member.

12. An upright frame including front and rear ends adapted for securement to drag and hoist lines, respectively, said frame further including horizontal forwardly facing cutter blade means projecting outwardly from one side of a lower portion of the frame adjacent the rear end thereof as well as an upper horizontally outwardly projecting abutment arm spaced above the cutter blade means for abutting a portion of an upright tree trunk spaced above a lower portion of the trunk against which the cutter blade means is advanced, said forwardly facing blade means is inclined slightly forwardly toward its outer end.

13. The combination of claim 12 wherein said frame includes means operative to angularly adjust said cutter blade means about a horizontal transverse axis relative to a transverse vertical plane containing said abutment arm and blade means.

14. The combination of claim 13 wherein the forwardly facing portions of said abutment arm include spaced forwardly projecting spikes for biting into said tree trunk.